April 21, 1936. G. T. DONCEEL 2,038,480
ELECTRICALLY CONTROLLED PRESSURE EQUALIZING APPARATUS
Filed June 28, 1933 2 Sheets-Sheet 1

Inventor
Guillaume Thomas Donceel.
by
Attorney

April 21, 1936.  G. T. DONCEEL  2,038,480
ELECTRICALLY CONTROLLED PRESSURE EQUALIZING APPARATUS
Filed June 28, 1933  2 Sheets-Sheet 2

Inventor:
Guillaume Thomas Donceel
BY
ATTORNEY

Patented Apr. 21, 1936

2,038,480

UNITED STATES PATENT OFFICE 2,038,480

ELECTRICALLY CONTROLLED PRESSURE EQUALIZING APPARATUS

Guillaume Thomas Donceel, Oklahoma City, Okla.

Application June 28, 1933, Serial No. 678,097

4 Claims. (Cl. 236—15)

This invention relates to certain new and useful improvements in electrically controlled pressure equalizing apparatus.

The primary object of the invention is to provide an electrically controlled pressure equalizing apparatus wherein forces of assigned ratios from different sources acting on opposite sides of a lever at one side of the lever fulcrum effect movements of the lever for operation of electrical devices controlling the action of draft apparatus.

It is a further object of the invention to provide control apparatus for a draft device that may be directly operated by pneumatic, hydraulic or other means and wherein opposed forces, such as suction and draft are associated with the control apparatus.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1:
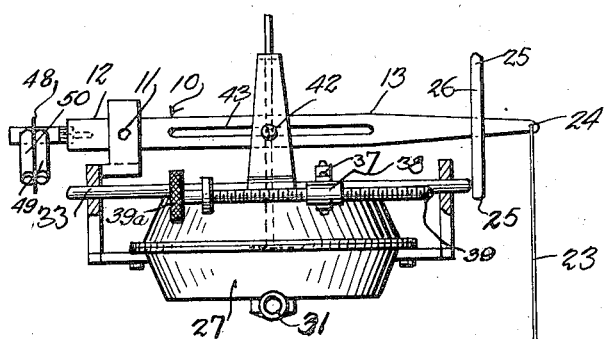
Figure 1 is a side elevational view, partly broken away and shown in section of the electrically controlled pressure equalizing apparatus showing the lever having the air draft and fuel pressure operated devices associated therewith at one side of the lever fulcrum and the switch at the opposite side of the fulcrum.

The electrically controlled pressure equalizing apparatus while adapted for various uses will be described as associated with the draft operated type of gas burner for furnaces. The apparatus includes a lever 10 to be pivotally mounted in proximity of one end thereof as at 11, the end pivot 11 providing relatively short and long arms 12 and 13. The draft flue of the furnace is in communication with the free end of the lever arm 13 by means of a gasometer-like construction 14 including an annular casing of receptacle formation having a bottom wall 15 and an annular side wall 16. The casing includes an inner concentric annular wall 17 providing a chamber 18 open at its upper end. A tapering funnel-like wall 19 extends from the upper edge of the inner annular wall 17 and terminates centrally of the bottom wall 15 in a reduced spout or pipe section 20 that is in communication with the draft flue of a furnace. A bell 21 forms a part of the gasometer-like construction 14 and has a depending annular flange 22 depending into the chamber 18 that is filled with liquid as is customary in such devices. The upper end of the bell 21 has a flexible cord or cable connection 23 with the free end of the lever arm 13 as at 24. In the presence of increased draft through the furnace flue, the bell 21 is drawn downwardly into the casing 14 to effect lowering movement of the lever arm 13, pivotal movements of the lever 10 being limited by stop pins 25 at the upper and lower ends of an arm 26 associated with the free end of the lever arm 13.

The pressure of the gas or liquid fuel supply system of the furnace is in communication with the lever arm 13 and acts to raise the lever arm 13 in opposition to a downward pull by the bell 21, the reference character 27 designating a casing divided by a diaphragm 28 into upper and lower chambers 29 and 30, the lower chamber 30 having a nipple connection 31 for attachment with the conduit supplying pressure from the gas or fuel supply system for the furnace. The casing 27 is adjustably supported above the gasometer-like casing 14 by means of bearings 32 carried by the upper side thereof and slidable on horizontally disposed guide rods 33. The adjustment of the casing 27 is in a direction lengthwise of the lever arm 13 and is accomplished by means of the lever 34 pivotally mounted as at 35 to swing in a horizontal direction, one end thereof having a pin and slot connection 36 with the upper side of the casing 27 while the other end thereof has a pin and slot strap connection 37 with a nut 38 threaded on a screw 39 swivelled as at 40 so that upon rotation of the screw 39 the casing 27 is shifted on the guide rod 33 to be positioned at the desired distance from the lever pivot 11. This adjustable or shifting movement of the casing 27 relative to the lever pivot 11, effects the assigning of the desired ratio between the two pressures exerted on the longer arm 13 of the lever 10, the assigned ratio being changeable at will. The connection between the casing 27 and lever arm 13 shows an inverted V-shaped strap 41 rising from the bearings 32. A rod 27a extending downwardly through an opening centrally of the top wall of the casing projects through the diaphragm 28 with its lower headed end 27b anchored to the under side of the diaphragm, the upper end of the rod extending upwardly through the V-shaped guide 41 and carrying intermediate its ends a cross pin 42 extending through the longitudinal slot 43 in the lever arm 13. The screw 39 is operated by the knurled head 39a.

Pivotal movement of the lever 10 is utilized for the operation of two arc shaped mercury tube switches which serve the function of a two-blade double throw switch for reversing the polarity of current supply to an electric motor that effects opening and closing movement of the draft damper of the furnace. A rotatable tubular shaft 44 is rotatably mounted by means of a bearing pin 45 at one end thereof in a plane parallel with and offset from the short arm 12 of the lever 10, its other end being supported in any convenient manner. The end of the tubular shaft 44 adjacent the bearing pin 45 is machined to provide a pinion 46 engaged by a rack plate 47 extending at right angles from the free end of the short arm 12 of the lever 10, the ratio of the plate gear 47 and pinion 46 being such that a full movement of the plate gear will turn the pinion through approximately 180°. A disk plate 48 is secured axially of the tubular shaft 44 substantially midway the ends thereof and carries upon opposite faces tubular arcuate mercury switches 49 and 50 respectively movable with the disk 48 on the tubular shaft 44 for moving a small quantity of mercury in each tube into position for the closing of switches, for controlling the direction of rotation of the reversible electric motor 51.

Figure 4:
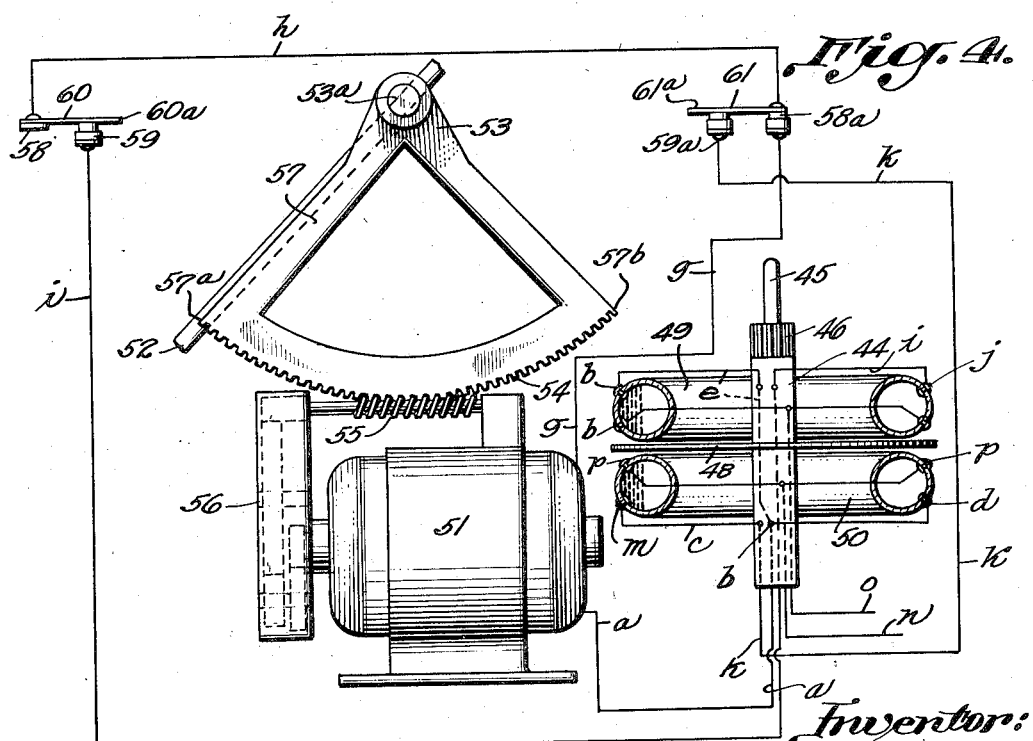
Figure 4 is a detail plan view of the mercury switches and supporting shaft therefor to be operated by a pressure operated lever together with the motor operated segment for operating the flue damper and further showing the cut-out switches for the motor rendered operable at extreme movement of the damper.

The reversible motor 51 is employed for the operation of the flue damper 52 for controlling the feed of air or draft through the flue of the furnace by means of the toothed sector 53 having the toothed portion 54 thereof engaged with the worm 55 driven by means of the shaft of the motor 51 through the medium of gear reduction mechanism 56. The flue damper 52 and the toothed sector 53 are mounted on the shaft 53a which constitutes a pivot therefor. The reversible motor 51 is placed in communication with a source of potential by the mercury tubes 49 and 50 and a pair of cut-out switches is set into the circuit wiring to be engaged by the toothed sector for bringing the motor 51 to rest and to stop movement of the damper 52 when moved to its fully open or closed position. The two throwout switches include respectively as shown in Figure 4, terminals 58—58a and 59—59a. The switch arms 60 and 61 carried by the terminals 58 and 58a are engageable with the terminals 59 and 59a and include overhanging portions 60a and 61a respectively engageable by the outer ends 57a and 57b of the side portions of the toothed sector 53 for breaking the circuit to the reversible motor 51 when the damper 52 has reached its fully open or closed position. The wiring arrangement for the mercury tube switches, throw-out switches and motor is briefly illustrated in Figure 4 and is of a character to effect rotation of the motor for the opening and closing movements of the damper 52 as well as bringing the damper to rest when in fully opened or closed position, the wire a from the motor 51, extending to and branching at the point b in the tubular shaft 44, one branch c extending for engagement with the contact d in the mercury tube switch 50 and the other branch e extending for engagement with the contact f in the mercury tube switch 49. According to the positions of the switches the wire g receives the electric current from either the wire h or the wire k, resulting in a change of polarity of the current in the wire g to correspond with the change of polarity in the wire a, the change in polarity resulting from the direction of throw of the mercury switch. The wire g from the motor 51 extends to the switch terminal 58a; and from the switch terminal 58a the wire h extends to terminal 58 and through the switch blade 60 to the terminal 59 and as the wire i to the contact j in the mercury tube switch 49; and from the switch terminal 58a the switch blade 61 extends to terminal 59a, and the wire k from the throw-out switch terminal 59a leads to the contact m in the mercury tube switch 50. The wires n and o in communication with a source of potential respectively lead to the contacts p in the mercury tube switch 50 and the contacts q in the mercury tube switch 49.

Figure 2:
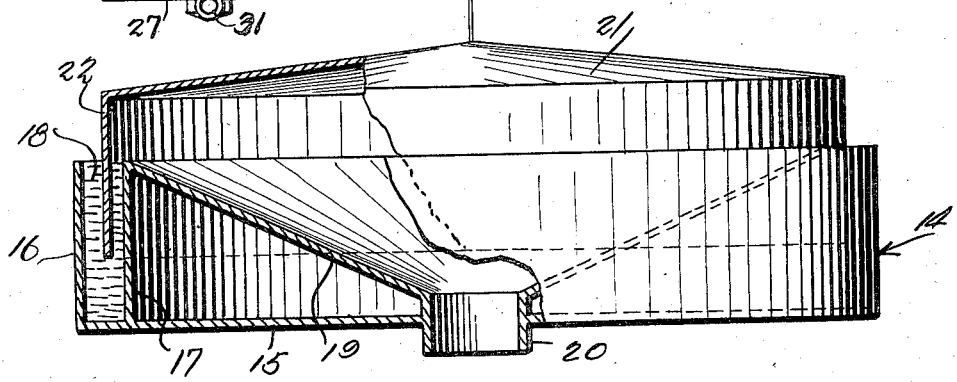
Figure 2 is a top plan view of the apparatus showing the adjustable mounting for the fuel pressure controlled device.
Figure 2:
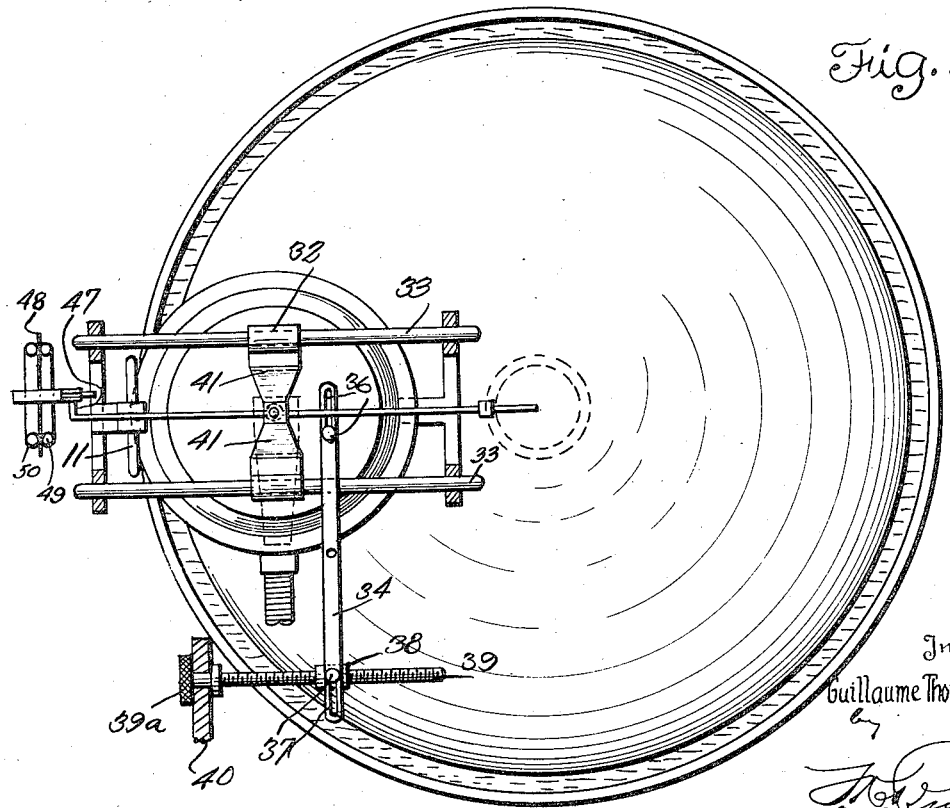
Figure 3:
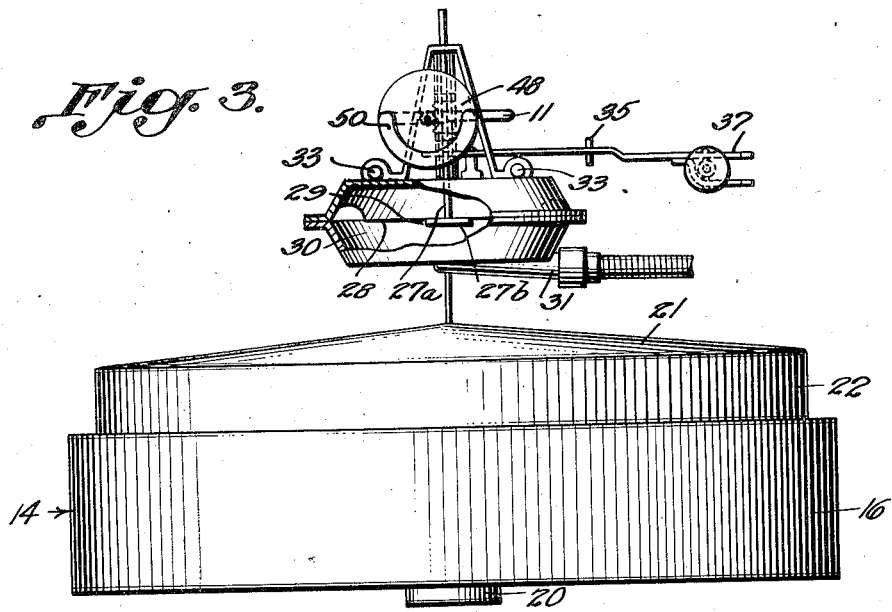
Figure 3 is a side elevational view, partly broken away and shown in section of the diaphragm casing in communication with the fuel supply system.

Communication is established between the tube section 20 of the gasometer-like casing and the combustion chamber of a furnace and communication is established between the fuel supply system registering pressure in the diaphragm casing 27 in a manner to allow gas pressure to act upon the lower side of the diaphragm 28. With the feeding of gas or other fuel for the operation of the furnace, pressure thereof acts upon the diaphragm in the casing 27 to raise the rod 27a to move the lever 10 upon its pivot 11 as shown in Figure 2 for rotating the tubular shaft 44 to move the mercury tube switch through an arc of approximately 90°, resulting in the closing of the circuit which operates the motor in the direction to open the damper 52. As the damper opens, the increased draft exerts an increased pull upon the bell of the gasometer and when the draft reaches the proper amount assigned for efficient combustion, the lever 13 is lowered to its normal position to accomplish the equalizing or balancing of the upward force exerted by the gas pressure with the mercury switches breaking the circuit to the motor 51. With a reduction in the amount of gas or other fuel fed to the furnace, the reduced pressure thereof under the diaphragm 28 in the diaphragm casing 27 allows the pull of the draft at the underside of the bell 21 of the gasometer-like casing 14 to overcome the gas pressure in the diaphragm casing 27 lowering the lever 13 and causing a reverse closing of the mercury tube switches 49 and 50, for the reverse operation of the motor 51 resulting in the closing of the damper until the draft diminishes sufficiently to allow the lever 10 to balance. When the upwardly exerted pressure on the lever 10 ceases, the damper is closed, the draft being reduced to a minimum for the conservation of heat. Extreme movements of the damper 52 is controlled by the toothed sector 53 having the ends 57a and 57b respectively engaged with the overhanging portions 60a and 61a of the throw-out switch blades 60 and 61 respectively for cutting off the supply of current to the motor 51 when the mercury tube switches are closed. The automatic regulation, equalization or balancing of the fuel and air supply to the furnace is accomplished by this apparatus in which fuel and draft pressure operate upon a lever at one side of the fulcrum thereof. The parts of the apparatus are so related as to counterbalance so that the weight of any part will not appreciably retard or aid the oppositely acting forces.

While there is herein shown and described the preferred embodiment of the invention, it is nevertheless to be understood that minor changes may be made therein without departing from the spirit and scope of the invention as claimed.

I claim:—

1. Electrically controlled pressure equalizing apparatus including a pivoted lever, suction and pressure operated devices exerting forces in opposite directions on the lever at one side of the lever fulcrum for balancing the lever, the pressure operated device including a diaphragm operated rod, a lateral pin carried thereby, the lever having an elongated slot therein receiving the pin and a screw device for shifting the pressure operated device longitudinally of the slotted end of the lever for varying the relationship of the opposing forces acting on the lever.

2. In operating mechanism for a furnace damper, a suction device adapted for communication with the combustion chamber of a furnace, a pressure operated device adapted for communication with the fuel supply for the furnace, a fulcrumed lever, said suction and pressure operated devices exerting forces in opposite directions on the lever at one side of the fulcrum, a flue damper for the furnace, operating means for the damper and means for rendering the damper operating means inoperative when the damper is in fully opened or closed position for stopping the motor, and the pressure operated device including a diaphragm operated rod, a lateral pin carried thereby, the lever having an elongated slot therein receiving the pin and means for shifting the pressure operated device relative to the slotted end of the lever for varying the relationship of the opposing forces acting on the lever.

3. In operating mechanism for a furnace damper, a suction device adapted for communication with the combustion chamber of a furnace, a pressure operated device adapted for communication with the pressure medium effecting supply of fuel to the furnace, a fulcrumed lever, said suction and pressure operated devices exerting forces in opposite directions on the lever at one side of the fulcrum, the suction operated device being connected to the outer end of the lever and the pressure operated device connected to the lever inwardly of its outer end and adjustable longitudinally of the lever, a furnace damper and operating means for the damper interposed between the damper and inner end of the lever.

4. In operating mechanism for a furnace damper, a suction device adapted for communication with the combustion chamber of a furnace, a pressure operated device adapted for communication with the pressure medium effecting supply of fuel to the furnace, a fulcrumed lever, said suction and pressure operated devices exerting forces in opposite directions on the lever at one side of the fulcrum the suction operated device being connected to the outer end of the lever and the pressure operated device connected to the lever inwardly of its outer end and adjustable longitudinally of the lever, and movable means controlled in its operation by said lever.

GUILLAUME THOMAS DONCEEL.